March 14, 1967 K. E. JANSEN ET AL 3,309,449

METHOD OF MOLDING A GROOVED PLASTIC STRIP

Filed Aug. 19, 1963

KELTON E. JANSEN
JAMES K. POPE
INVENTORS

BY John E. Faulkner
Thomas N. Oster
ATTORNEYS 3,309,449
METHOD OF MOLDING A GROOVED PLASTIC STRIP
Kelton E. Jansen and James K. Pope, Mount Clemens, Mich., assignors to Ford Motor Company, Dearborn, Mich., a corporation of Delaware
Filed Aug. 19, 1963, Ser. No. 302,971
4 Claims. (Cl. 264—248)

This invention is concerned with the manufacture and manipulation of plastic strips or molding commonly employed for decorative purposes in the trimming of automotive interiors. This invention is further concerned with a particular configuration of decorative plastic strip or molding and a procedure for securing such strip or molding to a plastic substrate.

This invention is explained in conjunction with six figures of drawing in which.

It is common practice in the finishing of automotive vehicle body interiors to apply to seat upholstery or door panels decorative plastic strips or moldings. These strips are usually secured to a plastic substrate by the application of heat dielectrically. Sufficient heat is so applied to autogenously fuse the decorative plastic strip to the plastic substrate. To enhance the decorative effect of these strips they are often provided with a metallized surface.

A typical decorative plastic strip is prepared by the extrusion from a die of a polyvinyl chloride base. A metallized polyester film may be applied to this base. A typical metallized film is sold under the trade name "Mylar."

These decorative plastic strips are routinely applied to a plastic substrate by means of a metal die. This metal die is provided with a depression complementary to the shape of the plastic strip and formed to govern the placement of the decorative strip on the substrate. This die serves to apply both pressure and dielectric heat to effectuate the fusion of the plastic strip to the substrate.

Experience has taught that the cross section of the decorative plastic strip and the cross section of the complementary depression in the die must be very carefully controlled when the usual type of plastic decorative strip is employed. If the cross section of the plastic strip should be larger than the complementary depression in the die, the fitting of the plastic strip into the die is difficult and time consuming. The finished article exhibits an excessive squeeze out or bond line flash resulting from this type of a misfit. If the cross section of the plastic strip is smaller than the complementary depression in the die the usual result is imperfect adhesion of the strip to the plastic substrate. This invention has been evolved to obviate the necessity of a precise match between the cross section of the plastic strip and the complementary depression in the die.

Figure 1:
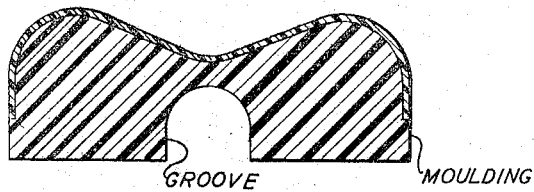
FIGURE 1 is a cross section of a typical decorative strip usable in this invention.
Figure 2:
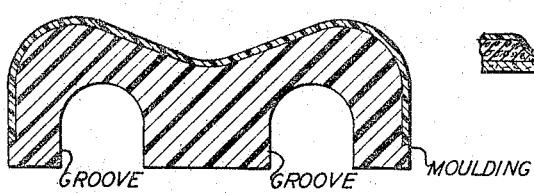
FIGURE 2 is a similar cross section of a variation of the strip shown in FIGURE 1.

The necessity of this precise match is avoided by resort to a cross section of the plastic strip such as is depicted in FIGURES 1 and 2. FIGURES 1 and 2 show the extruded vinyl core and the metallized Mylar laminate. The structure shown in FIGURE 1 is provided with a single central groove. That shown in FIGURE 2 shows two grooves symmetrically placed in the cross section of the strip. The purpose of these grooves is to permit the vinyl plastic material to flow transversely inwardly when the plastic material softens as it is heated. The pressure exerted by the die then causes this inward flow and prevents the formation of bond line flash.

Figure 3:
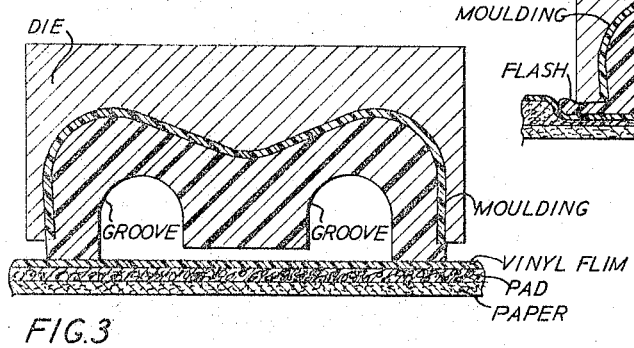
FIGURE 3 shows an early stage in the application of the decorative strip shown in FIGURE 2 to a plastic substrate.
Figure 4:
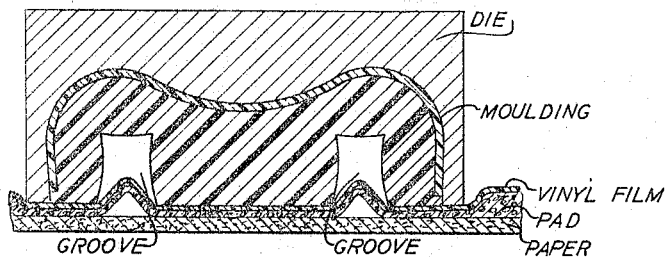
FIGURE 4 shows a more advanced stage of the application of the decorative strip.
Figure 5:
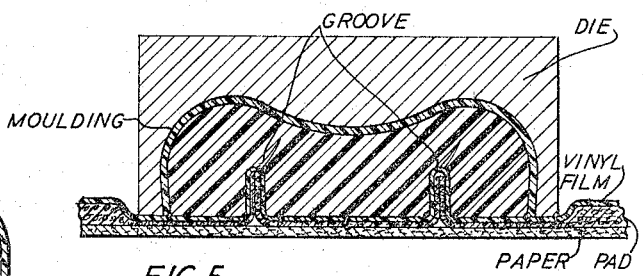
FIGURE 5 shows the decorative strip after the processes involved in its application to the substrate have been finished; and, FIGURE 6 is a showing analogous to FIGURE 5 except that it demonstrates the results usually obtained from prior art structures.

Three steps in the application of the decorative strip shown in FIGURES 2 are shown in FIGURES 3, 4 and 5. In these three figures of drawing the decorative plastic strip is shown being applied to a plastic substrate supported upon a resilient pad. The plastic substrate usually takes the form of a vinyl film and has been so designated. The plastic decorative strip is shown received in the complementary depression in the die.

FIGURE 3 shows the conditions that obtain before any pressure has been applied to the decorative plastic strip by the die.

FIGURE 4 shows the die in the closed position with conditions existing when heat has been applied and the plastic decorative strip has partially completed its inward flow into its final position. Attention is invited to the fact that the groove has been partially filled by material which has so flowed and that the softened plastic material of the substrate has initiated its flow into the partially filled groove.

FIGURE 5 shows the final stage of the operation. Here the heated plastic decorative strip has completed its inward flow and has almost completely filled the groove originally provided. The plastic substrate has softened and has flowed into the groove in the plastic strip and effectively interlocked these two elements. The presence of the grooves in the plastic strip has prevented the formation of any bond line flash.

Figure 6:
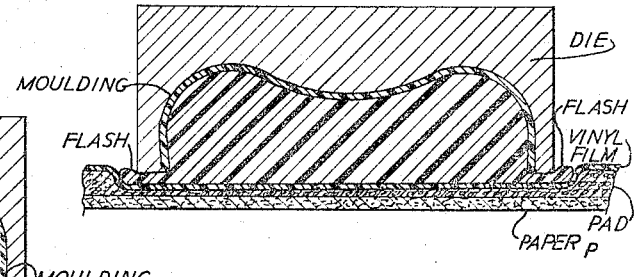

FIGURE 6 depicts the practice obtaining prior to this invention. In the structure shown in this figure of drawing the absence of any grooves has caused the plastic strip to flow outwardly and to produce a conspicuous bond line flash.

We claim as our invention:

1. The process of securing a longitudinally grooved plastic strip to a supporting substrate comprising inserting the longitudinally grooved plastic strip into a complementary impression in a die with a portion of the longitudinally grooved plastic strip extending beyond the plane of the die, pressing the longitudinally grooved face of the plastic strip against the substrate by means of the die and applying heat to the longitudinally grooved plastic strip to cause a portion of the plastic strip to soften and flow transversely inwardly into the longitudinal grooves and to secure the plastic strip to the substrate.

2. The process of securing a longitudinally grooved plastic strip to a supporting substrate comprising inserting the longitudinally grooved plastic strip into a complementary impression in a die with a portion of the longitudinally grooved plastic strip extending beyond the plane of the die, pressing the longitudinally grooved face of the plastic strip against the substrate by means of the die and applying heat to the longitudinally grooved plastic strip to cause a portion of the plastic strip to soften and flow transversely inwardly into the longitudinal grooves, to secure the plastic strip to the substrate and to diminish the size of the grooves in the grooved strip.

3. The process of securing a longitudinally grooved plastic strip to a supporting plastic substrate comprising inserting the longitudinally groove plastic strip into a complementary depression in a die with a portion of the longitudinally grooved plastic strip extending beyond the plane of the die, pressing the longitudinally grooved face of the longitudinally grooved plastic strip against the plastic substrate by means of the die and applying heat to the longitudinally grooved plastic strip and the plastic substrate to cause the longitudinally grooved plastic strip and the plastic substrate to soften, to cause the longitudinally grooved plastic strip to flow transversely inwardly into the longitudinal grooves, to cause the plastic substrate to flow into interlocking engagement with the longitudinal grooves in the plastic strip and to secure the longitudinally grooved plastic strip to the plastic substrate.

4. The process of securing a longitudinally grooved plastic strip to a supporting plastic substrate comprising inserting the longitudinally grooved plastic strip into a complementary depression in a die with a portion of the longitudinally grooved plastic strip extending beyond the plane of the die, pressing the longitudinally grooved face of the longitudinally grooved plastic strip against the plastic substrate by means of the die and applying heat to the longitudinally grooved plastic strip and the plastic substrate to cause the longitudinally grooved plastic strip and the plastic substrate to soften, to cause the longitudinally grooved plastic strip to flow transversely inwardly into the longitudinal grooves, and to diminish the sides of the grooves to cause the plastic substrate to flow into interlocking engagement with the longitudinal grooves in the plastic strip and to secure the longitudinally grooved plastic strip to the plastic substrate.

References Cited by the Examiner
UNITED STATES PATENTS

| | | | |
|---|---|---|---|
| 1,466,086 | 8/1923 | Christenson | 156—225 |
| 1,958,131 | 5/1934 | Davidson | 156—225 |
| 2,397,743 | 4/1946 | Kaphan | 264—248 |
| 2,698,272 | 12/1954 | Clapp et al. | 156—225 |
| 2,744,564 | 5/1956 | Woodburn | 156—223 |
| 3,075,862 | 1/1963 | Hoyer | 156—222 X |

ALEXANDER H. BRODMERKEL, *Primary Examiner.*

ROBERT F. WHITE, *Examiner.*

M. SUSSMAN, F. S. WHISENHUNT, D. J. ARNOLD,
*Assistant Examiners.*